United States Patent [19]
Redey

[11] Patent Number: 4,728,590
[45] Date of Patent: Mar. 1, 1988

[54] ELECTROCHEMICAL CELL WITH HIGH DISCHARGE/CHARGE RATE CAPABILITY

[75] Inventor: Laszlo Redey, Downers Grove, Ill.

[73] Assignee: The United States of America as represented by the United States Department of Energy, Washington, D.C.

[21] Appl. No.: 890,256

[22] Filed: Jul. 28, 1986

[51] Int. Cl.[4] .............................................. H01M 4/02
[52] U.S. Cl. ...................................... 429/221; 252/519
[58] Field of Search ................ 502/216, 222; 252/519; 429/221

[56] References Cited

U.S. PATENT DOCUMENTS

| | | | |
|---|---|---|---|
| 3,898,096 | 8/1975 | Herddy et al. | 136/6 F |
| 3,907,589 | 9/1975 | Gay et al. | 136/6 R |
| 3,941,612 | 3/1976 | Steunenberg et al. | 136/20 |
| 3,947,291 | 3/1976 | Yao et al. | 429/221 |
| 3,992,222 | 11/1976 | Walsh et al. | 429/221 |
| 4,011,373 | 3/1977 | Kaun et al. | 429/221 |
| 4,079,303 | 3/1978 | Cox | 320/17 |
| 4,086,404 | 4/1978 | Vissers et al. | 429/220 |
| 4,164,069 | 8/1979 | Tomczuk | 429/221 |
| 4,172,926 | 10/1979 | Shimotake et al. | 429/221 |
| 4,223,078 | 9/1980 | Armand et al. | 429/194 |
| 4,238,721 | 12/1980 | DeLuca et al. | 320/18 |
| 4,357,398 | 11/1982 | Nelson et al. | 429/94 |
| 4,386,019 | 5/1983 | Kaun et al. | 252/503 |
| 4,446,212 | 5/1984 | Kaun | 429/103 |
| 4,481,267 | 11/1984 | Bowden et al. | 429/221 |
| 4,540,642 | 9/1985 | Kaun | 429/131 |

FOREIGN PATENT DOCUMENTS 0022793 2/1977 Japan.
0002443 1/1983 Japan.

OTHER PUBLICATIONS

Redy et al, "Resistance Characterization of Nickel Sulfate Electrodes in LiCl-containing Molten Salt Electrolytes", Advances in Battery Materials and Processes, The Electrochemical Society (1984).
ANL-84-93 Lithium-Alloys/FeS Cell Design and Analysis Report", Argonne National Laboratory (1985).

Primary Examiner—John F. Niebling
Assistant Examiner—Steven P. Marquis
Attorney, Agent, or Firm—Hugh W. Glenn; Robert J. Fisher; Judson R. Hightower

[57] ABSTRACT

A fully charged positive electrode composition for an electrochemical cell includes $FeS_2$ and $NiS_2$ in about equal molar amounts along with about 2-20 mole percent of the reaction product $Li_2S$. Through selection of appropriate electrolyte compositions, high power output or low operating temperatures can be obtained. The cell includes a substantially constant electrode impedance through most of its charge and discharge range. Exceptionally high discharge rates and overcharge protection are obtainable through use of the inventive electrode composition.

15 Claims, 5 Drawing Figures

ELECTROCHEMICAL CELL WITH HIGH DISCHARGE/CHARGE RATE CAPABILITY

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention relates to high temperature secondary electrochemical cells and electrodes for such cells. In particular, it relates to electrochemical cells employing molten alkali metal halides as electrolyte, lithium or lithium alloy as negative electrode material and transition metal chalcogenides as positive electrode material. Representative electrochemical cells of this type are disclosed in U.S. Pat. Nos. 3,907,589 to Gay et al., 3,992,222 to Walsh et al., 4,386,019 to Kaun et al., 4,446,212 and 4,540,642 to Kaun and in ANL-84-93, "Li-Alloy/FeS Cell Design and Analysis Report".

Secondary electrochemical cells of this type can be used over long periods of times with numerous charging and discharging cycles. They have high capacity for energy storage and can be assembled into batteries of cells for a multiplicity of applications. Typical uses include principal and auxillary power sources for electric or other vehicles, storage of off peak power in conjunction with electric utilities, and power sources for remote locations in space or remote terrestial locations.

Considerable development work has been carried out in electrochemical cells of this type. The electrodes have been assembled in both the charged and discharged state and reaction products have been incorporated into the original electrode compositions as is described in U.S. Pat. No. 3,907,589 cited above. Various mixtures of electrode reactive materials have been investigated. For instance, additives in minor amounts of metal sulfides have been incorporated into positive electrodes with iron disulfide reactants as is shown in U.S. Pat. No. 3,992,222. However, none of these earlier efforts have produced an electrochemical cell with positive electrodes of consistently low impedance throughout its full discharge range. As an example, FIG. 3A of U.S. Pat. No. 3,992,222 shows relatively poor performance for an $FeS_2$- NiS positive electrode.

In applications requiring high power output over a short period of time, rapid discharge of the electrochemical cells must occur. In these applications, it is of importance to have constant impedance over the full discharge cycle of the selected electrochemical cell. Unfortunately, electrochemical cells with the transition metal chalcogenides as electrode material have not demonstrated sufficient consistency in impedance for good power source control.

One other drawback of electrodes with metal sulfide active material is the requirement of overcharge protection. Complex control systems such as shown and described in U.S. Pat. No. 4,079,303 to Cox and 4,238,721 to DeLuca et al. have been proposed to prevent damage to structural components in the cell during charging. Without such a system a battery could not be charged to full capacity.

SUMMARY OF THE INVENTION

Therefore, in view of the above, it is an object of the present invention to provide an improved secondary electrochemical cell.

It is a further object to provide a positive electrode with improved reaction performance for use in a high temperature secondary electrochemical cell.

It is a further object of the present invention to provide an electrochemical cell with a substantially flat specific impedance throughout its full range of charge and discharge.

It is also an object of the present invention to provide an electrochemical cell with a metal sulfide positive electrode which includes internal overcharge protection.

These and other objects of the invention are accomplished in a positive electrode reactant mixture that includes $Li_2S$ in sufficient amount to be present in solid form in the cell in all states of charge and discharge and a combination of metals including iron and nickel as metal sulfides or as elemental metal, wherein the molar ratio of iron to nickel is about 3:1 to 1:3.

In the charged state the reactant mixture can include $FeS_2$, $NiS_2$ and $Li_2S$. These sulfides may combine as double or multiple metal compounds possibly including ions from the electrolyte. In the various uncharged or discharged states, elemental iron and nickel metal as lower sulfides of iron and nickel can be present provided that solid $Li_2S$ is present in the cell at any state charge or discharge.

Solid $Li_2S$ is contemplated as an essential constituent associated with the positive electrode reactant mixture. However, such constituent may be introduced into or may migrate to and from other cell components such as the separator, the electrolyte, the negative electrode or other portions of the cell.

In further aspects of the invention, iron and nickel are present in the positive electrode reactant mixture in about equal molar amounts.

In other aspects, solid $Li_2S$ is present in not less than 2 but not more than 20 mole percent of the positive electrode reactant mixture.

The present invention also contemplates an electrochemical cell with a negative electrode containing lithium or lithium alloy as reactant, an electrolyte including a lithium halide and a positive electrode with iron and nickel in elemental or sulfide form. The cell includes sufficient lithium sulfide present as solid regardless of the charge or discharge state of the cell.

In more specific aspects, the iron and nickel are present in an Fe:Ni ratio of about 3:1 to 1:3 and the $Li_2S$ is present in the cell at a level of at least 2 mole percent of the positive electrode reactant mixture.

DETAILED DESCRIPTION OF THE DRAWING

The present invention is illustrated in the accompanying drawing wherein.

DETAILED DESCRIPTION

Figure 1:
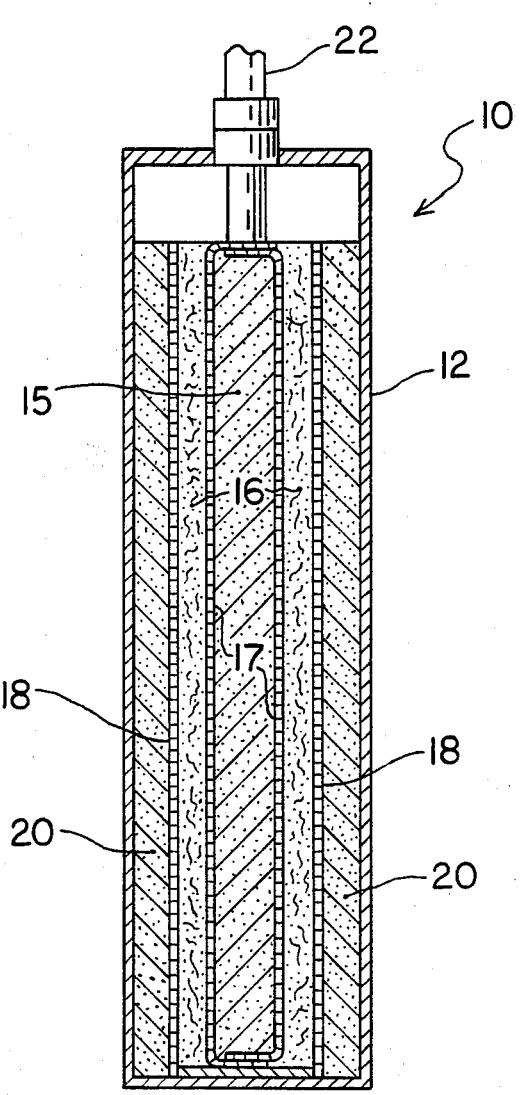
FIG. 1 is a schematic view in cross-section of a secondary electrochemical cell.

FIG. 1 illustrates an electrochemical cell 10 within a cell housing 12. The cell is illustrated with a central electrode 15 disposed between two electrodes 20 of opposite polarity to that of electrode 15. For instance, electrode 15 can be positive and electrodes 20 of negative polarity, but in some instances the reverse may be advantageous.

Perforated sheets of electrically conductive metals 17 and 18 at the outwardly facing surfaces of electrode 15 and at the inwardly facing surfaces of electrodes 20 serve as current collectors. The sheets along with the inner surfaces of housing 12 can be plated or coated with a corrosion resistant material such as molybdenum, titanium nitride or titanium carbide. Electrically insulative, porous separators 16, such boron nitride, magnesium oxide, or other known corrosion resistant dielectric materials can be employed between the electrodes. Electrical connection can be made to the terminal 22, at electrode 15 potential, and to the cell housing 12 at the electrical potential of electrodes 20.

The electrode separators as well as the electrodes are filled with an alkali metal halide electrolyte. In applications requiring high power output, an all lithiumcation electrolyte can be selected. A preferred composition comorises by mole percent, 22% LiF, 31% LiCl and 47% LiBr having a melting point of 430° C.

Various other electrolyte compositions of alkali metal halides also may be selected from those disclosed in the U.S. Patents cited herein. A low melting point eutectic such as one of lithium and potassium halides can be selected where moderate operating temperatures are desired. One well-suited eutectic composition is disclosed in U.S. Pat. Ser. No. 868,388 filed May 29, 1986 and includes 25 mole percent LiCl 38 mole percent LiBr and 37 mole percent KBr. This compostion has a melting point of 310° C.

The positive electrode of the electrochemical cell of this invention is prepared to contain a mixture of FeS$_2$, NiS$_2$ and Li$_2$S with the electrode in the fully charged state. The reactants can he blended in particulate form with the electrolyte and extruded or otherwise put into electrode chambers defined hetween the current collector surfaces. Such electrode preparation methods are well known and disclosed in earlier U.S. Patents, such as U.S. Pat. Nos. 4,540,642, 4,446,212 and 4,386,019. These U.S. Patents are expressly incorporated by reference to disclose electrode preparation techniques.

In describing the present invention, the positive electrode reactant mixture is presented in terms of FeS2, NiS2 and LiS2 constituents. It will be understood that these constituents may combine along with ions from the electrolyte to form compounds with double, triple or multiple metals during operation of the cell.

Moreover, the Li$_2$S can be introduced into or may migrate to and from other cell components. For instance, in assembling the cell, all or part of the solid Li$_2$S can be introduced not only in the positive electrode but also in the separator, the electrolyte, the negative electrode or another portion of the cell.

It is also contemplated that the electrodes can be prepared in the uncharged state. Iron and Nickel metals are mixed with sufficient Li$_2$S to provide the recuired composition when the cell is fully charged.

The negative electrode of the electrochemical cell employs lithium metal as the negative electrode reactant. In order to maintain the negative electrode in solid form, lithium is present as a solid alloy such as lithium-aluminum, lithium-silicon, lithium-aluminum-silicon or any other suitable negative electrode material.

Through use of the positive electrode of the present invention, an electrochemical cell of an exceptionally stable electrode impedance is obtained throughout the full range of charge and discharge depth. Both the iron disulfide and the nickel disulfide are included as electrode reactants. Each are included in substantial portions between 0.3 to 0.7 mole ratio in respect to the other principal reactant. Although such range is within the scope of the present invention, it is preferred that the iron disulfide and nickel disulfide reactants be included in about equal molar amounts.

In addition to the mixture of iron and nickel disulfides, a substantial amount of lithium sulfide is included in the positive electrode or in another portion of the cell, e.g. as a paste with the electrolvte. Solid lithium sulfide is to be present in all states of charge or discharge in excess of that which would be produced through discharge of the FeS$_2$-NiS$_2$ electrode composition in the course of the electrochemical cell reaction.

The lithium sulfide can be added as solid particulate to the initial positive electrode composition or introduced into some other cell constituent such as the electrolyte for migration to the positive electrode during the course of cell cycling. In the figures discussed below, the present invention is illustrated with test cells having an excess of Li$_2$S, e.q. about 20 mole percent associated with the positive electrode. The invention only requires sufficient Li$_2$S for it to be present in solid undissolved form regardless of the charge state of the cell. Ordinarily, it is included at about 2 to 20 mole percent typically about 10 mole percent of the positive electrode reactant composition.

Figure 2:
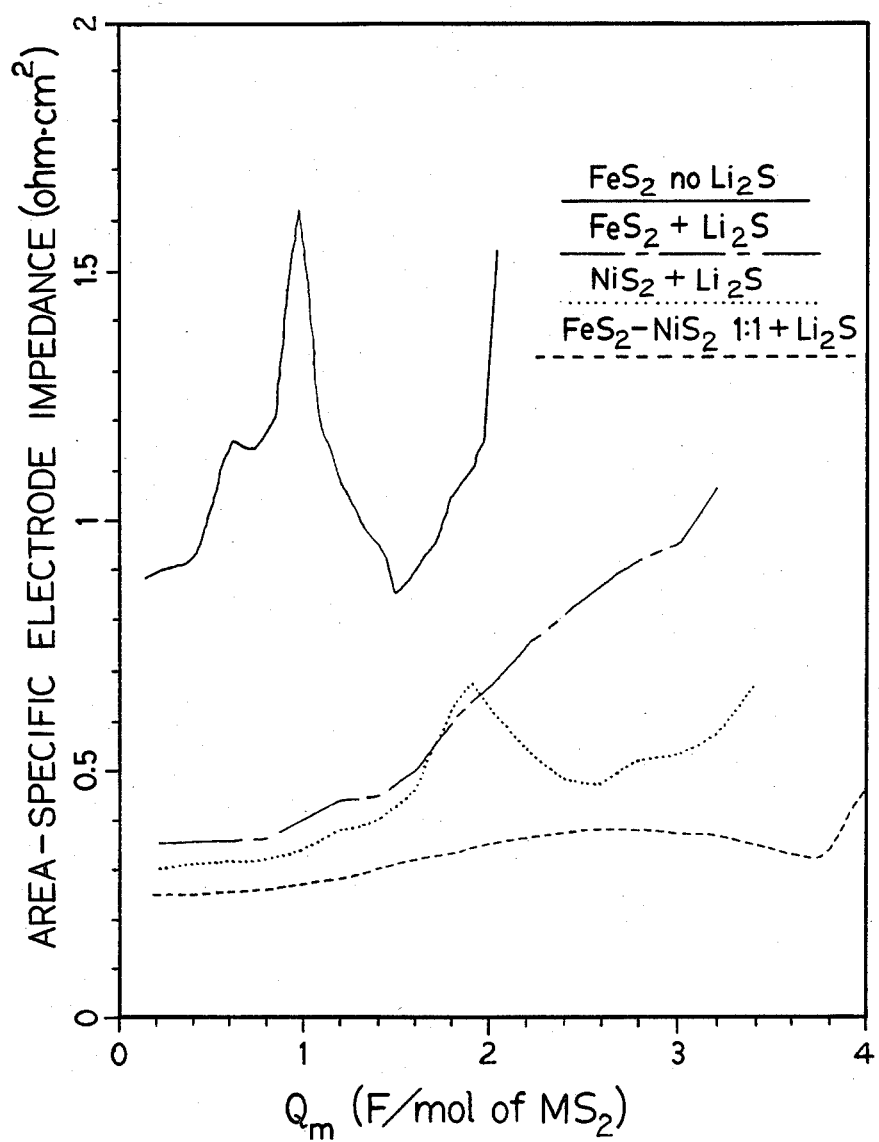
FIG. 2 is a graph of Area-Specific Electrode Impedance versus Discharged Faradays per mole of metal disulfide reactant for several positive electrodes.
Figure 3:
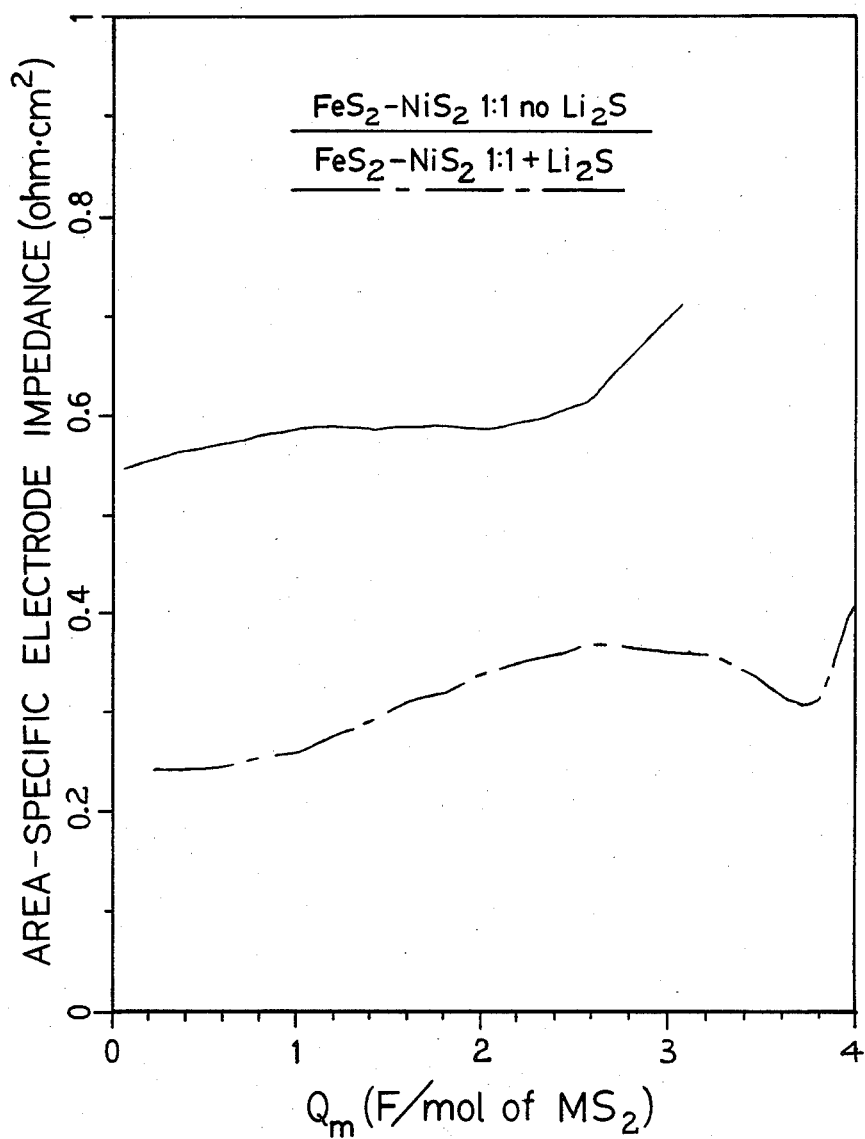
FIG. 3 is a graph with the abscissa and expanded ordinate of FIG. 2 comparing positive electrodes containing $FeS_2$-$NiS_2$ with and without the presence of solid $LiS_2$ in the cell.

The inventor has discovered a positive electrode composition that provides exceptionally stable specific impedance over the full range of discharge. This unexpected stability is illustrated in FIGS. 2-3 in which an electrode of the present invention is compared with other positive electrodes. The invention is represented by a positive electrode having equal molar amounts of FeS$_2$ and NiS$_2$ with 20 mole percent Li$_2$S. The comparitive electrodes in FIG. 2 include FeS$_2$ with no Li$_2$S additive, FeS$_2$ with 20 mole percent Li$_2$S and NiS$_2$ with 20 mole percent Li$_2$S. In FIG. 3, an electrode with FeS$_2$-NiS$_2$ and no Li$_2$S is compared with the electrode of this invention. Negative electrodes containing lithium-aluminum alloy are used opposite each positive electrode.

It is clearly seen from FIG. 2 that the iron disulfide positive electrode exhibits extreme changes in area-specific impedance during discharge. The electrodes with lithium sulfide additive exhibit substantial reduction in area-specific impedance, however, there are considerable variations in impedance for electrodes other than the electrode of this invention. In FIG. 3 it is seen that an electrode of FeS$_2$-NiS$_2$ with no Li$_2$S exhibits greater impedance throughout the full range of charge and poorer stability in the upper half of the charge range than the electrode of this invention.

The positive electrode representing the present invention not only exhibits the lowest specific electrode impedance of any shown in FIG. 2 and 3 but also exhibits excellent stability throughout the full discharge range.

Figure 4:
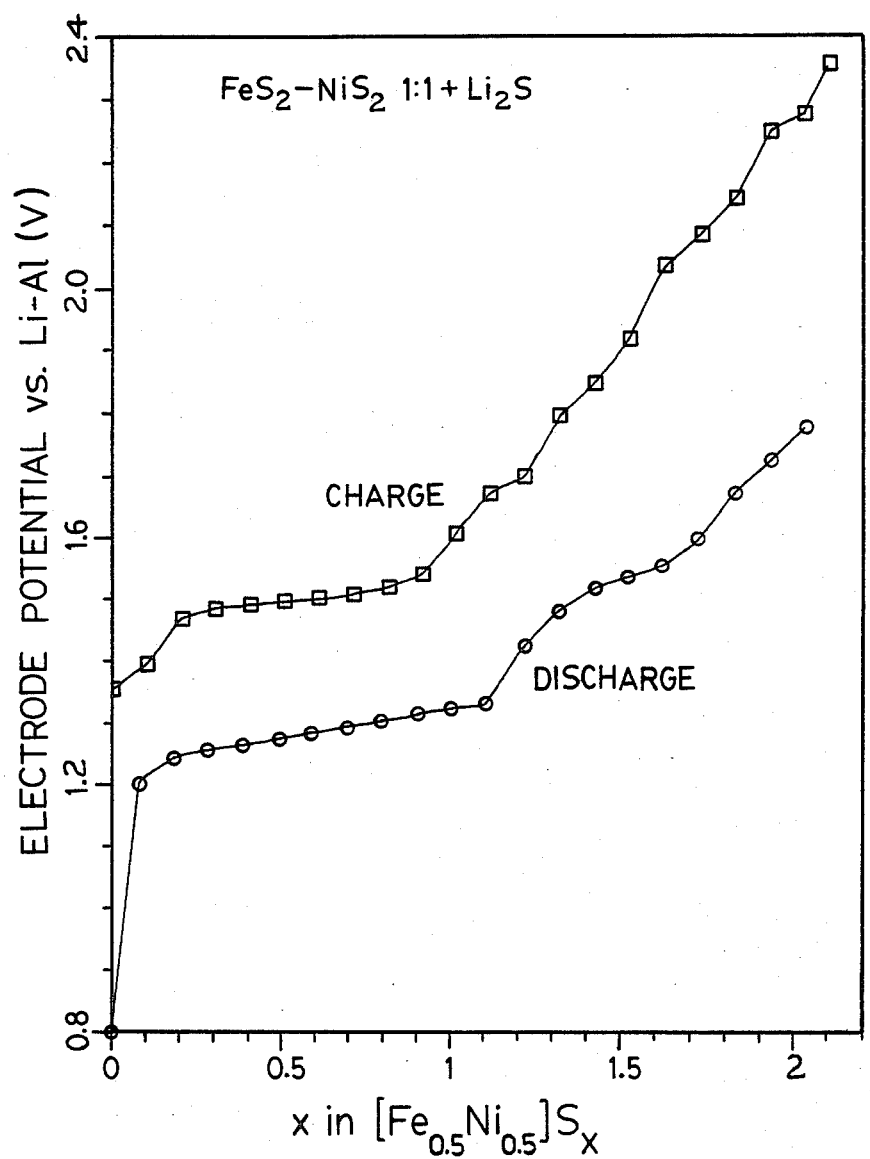
FIG. 4 is a graph of charge and discharge potentials of a (FeS$_2$-NiS$_2$-Li$_2$S) positive electrode at a two hour rate versus a lithium-aluminum reference electrode.
Figure 5:
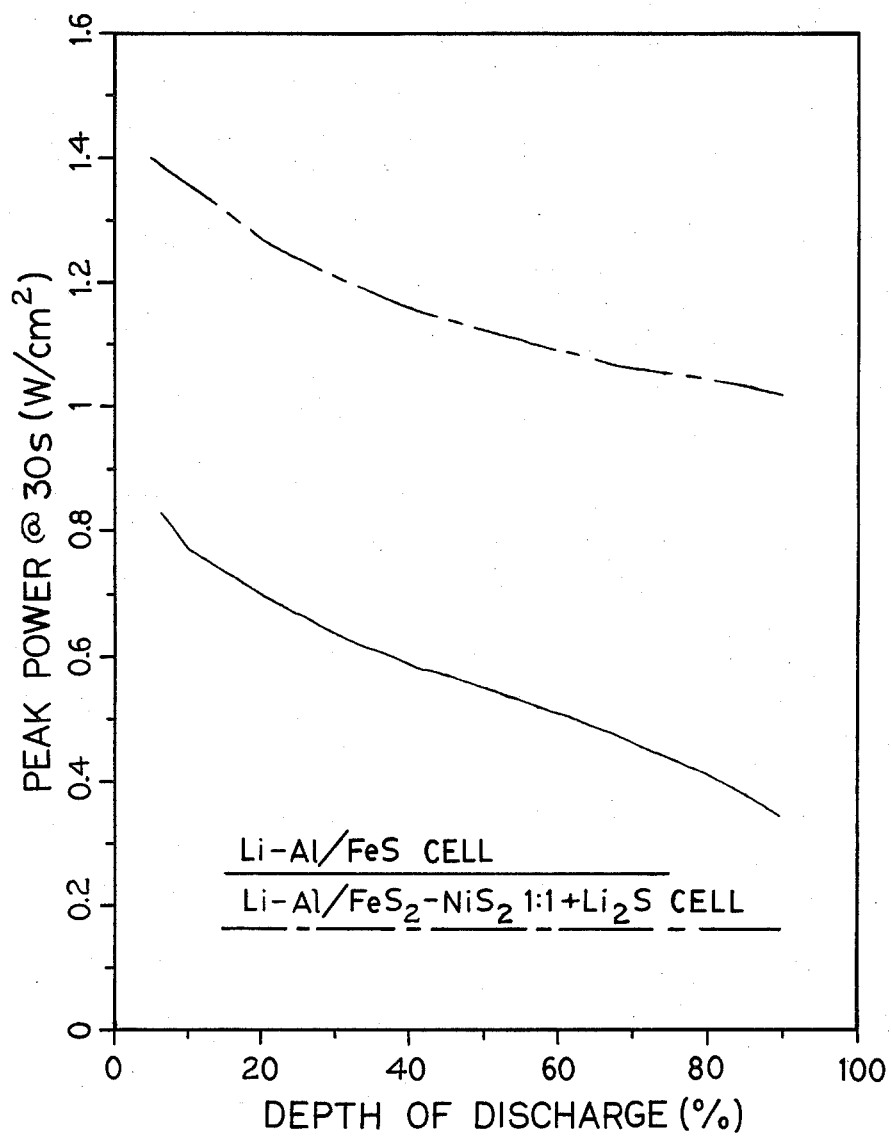
FIG. 5 is a graph showing peak power at the end of a 30-second current pulse versus Depth of Discharge for a LiAl/FeS cell compared to the cell of the present invention.

Other unexpected properties of the Inventor's positive electrode are illustrated in FIGS. 4 and 5. In FIG. 4, an electrode with equal amounts of iron and nickel disulfides along with about 20 mole % $Li_2S$ is examined for electrode potential against a lithium-aluminum alloy electrode at 200 mA/cm$^2$ current density. At least 1.2 volts discharge potential is exhibited over nearly the full discharge range.

The electrochemical cell of this invention provides overcharge protection that heretofore has not been recognized in electrochemical cells with ordinary metal sulfide positive electrodes. As is discussed in U.S. Pat. No. 4,079,303, $LiAl/FeS_2$ cells are limited to upper level charge voltages of about 2.1 volts or electrochemical attack may occur to the cells structural components. It is seen in FIG. 4 that charge voltage of 2.2 to 2.4 volts were used in the cell of this invention and no structural damage was noted. Overcharge protection in the present cell may occur through formation of $Li_2S_2$ from $Li_2S$ in the positive electrode and reaction of the $Li_2S_2$ with lithium metal in the negative electrode to again form $Li_2S$ with the release of heat. This protection has not been recognized before the inventor's work, even in electrodes including excess $Li_2S$.

In FIG. 5, an electrochemical cell of the present invention is compared with a LiAl/FeS cell to illustrate a substantial increase in peak power output at the end of a 30-second discharge. Although the cell of the present invention contains disulfide reactant and the comparitive cell FeS, the second half of discharge depth for the inventive cell is comoarable with the full discharge depth of the LiAl/FeS cell. It is seen that at nearly 90% discharge, the cell of the invention exhibits greater peak power than the nearly fully charged conventional cell.

EXAMPLE

An electrochemical cell with a lithium-aluminum alloy negative electrode, an electrolyte of LiCl-LiBr-LiF and a positive electrode of $FeS_2$-$NiS_2$-$Li_2S$ is prepared The negative electrode is a porous compact of lithium-aluminum particles with lithium and aluminum in about equal molar amounts. The electrolyte includes a eutectic of about 31 mole percent LiCl, about 47 mole percent LiBr and about 22 mole percent LiF. The positive electrode includes particulate $FeS_2$ and $NiS_2$ in equal molar amounts combined with about 10 mole percent $Li_2S$ with at least sufficient electrolyte to wet the disulfide particles at the cell operating temperatures. When operated with rapid charge and discharge rates of about 2 hours, the cell can be expected to exhibit extremely good stability in impedance over the full coulombic range.

The positive electrode reactant material and the electrochemical cell of the present invention provide an electrochemical power source of exceptionally good impedance stability over its full range of discharge. The electrochemical cell can be discharged in a short time interval to provide a very high and consistent power output. Also, it can be charged to an unexpectedly high voltage without damage due to its internal overcharge protection.

Although the present invention has been described in terms of specific materials and structure, it will be clear to one skilled in the art to which the invention pertains that various changes and modifications can be made in the materials, structure and process steps within the scope of the following claims.

The embodiments of this invention in which an exclusive property or priviledge is claimed are defined as follows:

1. A fully charged electrode reactant mixture for use in a positive electrode in an electrochemical cell to impart overcharge protection, said reactant mixture comprises the combination of $FeS_2$, $NiS_2$, and $Li_2S$, wherein $Li_2S$ is in sufficient amount to be present in solid form in all states of charge and discharge, and wherein $FeS_2$ and $NiS_2$ are present in molar ratio of about 3;1 to 1;3.

2. The electrode reactant mixture of claim 1 wherein the mixture includes iron disulfide and nickel disulfide in about equal molar amounts.

3. The electrode reactant mixture of claim 1 wherein solid $Li_2S$ is present in the cell in an amount of at least 2 mole percent of the reactant mixture.

4. The electrode reactant mixture of claim 3 wherein said solid $Li_2S$ is present in a range of about 2 to 20 mole percent.

5. The electrode reactant mixture of claim 1 wherein alkali metal halide electrolyte is combined with the reactant mixture in a positive electrode.

6. An electrochemical cell capable of exhibiting overcharge protection including a negative electrode with lithium or lithium alloy as reactant, an electrolyte including a lithium halide and a positive electrode, the positive electrode includes a reactant mixture of iron in elemental or sulfide form, and nickel in elemental or sulfide form, wherein the iron and nickel are present in an Fe:Ni ratio of about 3:1to 1:3 and wherein lithium sulfide is present in the cell in excess of the amount required to form $FeS_2$ and $NiS_2$ with all iron and nickel in the positive electrode reactant mixture.

7. The electrochemical cell of claim 6 wherein the $Li_2S$ is present in the cell as a solid at a level sufficient to be at least 2 mole percent of the fully charged positive electrode reactant mixture.

8. The electrochemical cell of claim 6 wherein the positive electrode includes a reactant mixture of $FeS_2$, $NiS_2$ and $Li_2S$ wherein the $Li_2S$ is present at a level of about 2 to 20 mole percent of the mixture.

9. The electrochemical cell of claim 6 wherein the $FeS_2$ and $NiS_2$ are present in about equal molar amounts in the reactant mixture and wherein $Li_2S$ is present at about 10 mole percent of the reactant mixture.

10. The electrochemical cell of claim 6 wherein the electrolyte comprises a mixture of LiF-LiCl-LiBr in molar percentages of 22-31-47 respectively for providing a high power output.

11. The electrochemical cell of claim 6 adapted for reduced temperature operation having an electrolyte of LiCl-LiBr and KBr in molar percentages of 25, 38 and 37 percent respectively.

12. A fully charged positive electrode composition for imparting overcharge protection to a secondary electrochemical cell comprising $Li_2S$, $FeS_2$ and $NiS_2$, wherein the $FeS_2$ and $NiS_2$ are present in a molar ratio to each other of about 1:3 to 3:1 and wherein the $Li_2S$ is present at about 2 to 20 mole percent of the $FeS_2$, and $Li_2S$ reactant mixture and wherein the compostion further includes an electrolyte of alkali metal halides.

13. The positive electrode composition of claim 12 wherein $FeS_2$ and $NiS_2$ are present in about equal molar amounts and the Li$_2$S is present at about 20 mole percent of the reactant mixture.

14. The positive electrode composition of claim 12 wherein the electrolyte consists essentailly of lithium halides.

15. The positive electrode composition of claim 12 in fully charged state following exposure to a charge voltage of about 2.2 to 2.4 volts versus a lithium-aluminum alloy negative electrode comprising FeS$_2$ and NiS$_2$ in about equal molar amounts and at least 2 mole percent Li$_2$S with portions converted to Li$_2$S$_2$.

* * * * *